United States Patent [19]

Gerber

[11] Patent Number: 5,661,566
[45] Date of Patent: Aug. 26, 1997

[54] METHOD FOR MAKING A PLURALITY OF PRINTING PLATES

[75] Inventor: Heinz Joseph Gerber, West Hartford, Conn.

[73] Assignee: Gerber Systems Corporation, South Windsor, Conn.

[21] Appl. No.: 404,200

[22] Filed: Mar. 13, 1995

[51] Int. Cl.$^6$ .............................. H04N 1/23; H04N 1/387
[52] U.S. Cl. ................................. 358/304; 358/450
[58] Field of Search ..................... 358/296, 300, 358/304, 448, 450, 452, 453; 395/108, 109, 115–117, 133, 145, 146

[56] References Cited

U.S. PATENT DOCUMENTS

| | | | |
|---|---|---|---|
| 3,949,159 | 4/1976 | Ricards et al. | 178/6.6 B |
| 4,240,119 | 12/1980 | Nortonet et al. | 358/297 |
| 4,267,548 | 5/1981 | Kimura et al. | 340/146.3 AH |
| 4,342,052 | 7/1982 | Rockley et al. | 358/287 |
| 4,588,291 | 5/1986 | Lulay et al. | 355/77 |
| 4,636,872 | 1/1987 | Prichard | 358/296 |
| 4,672,462 | 6/1987 | Yamada | 358/280 |
| 4,853,709 | 8/1989 | Stein et al. | |
| 4,893,194 | 1/1990 | Sakata | 358/443 |
| 5,047,843 | 9/1991 | Miyakawa | 358/75 |
| 5,105,283 | 4/1992 | Forest et al. | 358/401 |
| 5,140,348 | 8/1992 | Jamzadeh et al. | 346/157 |
| 5,191,440 | 3/1993 | Levine | 358/450 |
| 5,207,414 | 5/1993 | Schimanski | 271/5 |
| 5,231,516 | 7/1993 | Kamon et al. | 358/449 |
| 5,274,761 | 12/1993 | Davidson et al. | 395/164 |
| 5,276,465 | 1/1994 | Menard | 346/134 |
| 5,291,392 | 3/1994 | Gerber et al. | 364/167.01 |

FOREIGN PATENT DOCUMENTS

| | | |
|---|---|---|
| 0 126 469 | 11/1984 | European Pat. Off. . |
| 2 160 055 | 12/1985 | United Kingdom . |

*Primary Examiner*—Eric Frahm
*Attorney, Agent, or Firm*—McCormick, Paulding & Huber

[57] ABSTRACT

A method for making a plurality of printing press page printing plates using a drum type raster scanning plate making machine involves making a number of separate printing plates from each sheet of plate making material handled by the machine, thereby increasing the number of printing plates capable of being made during a given period of time in comparison to prior methods using similar machines and making only one printing plate from each sheet of plate making material.

13 Claims, 3 Drawing Sheets

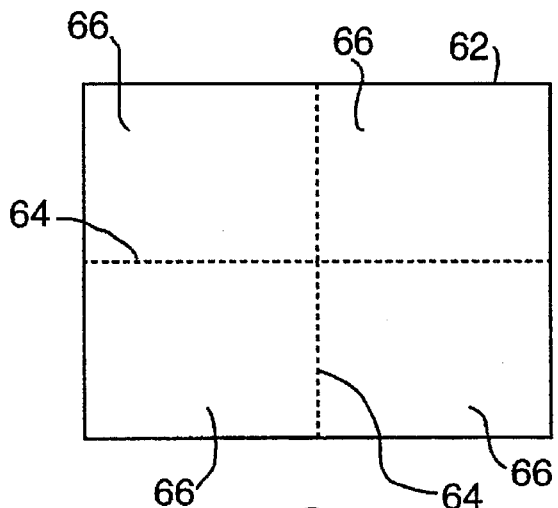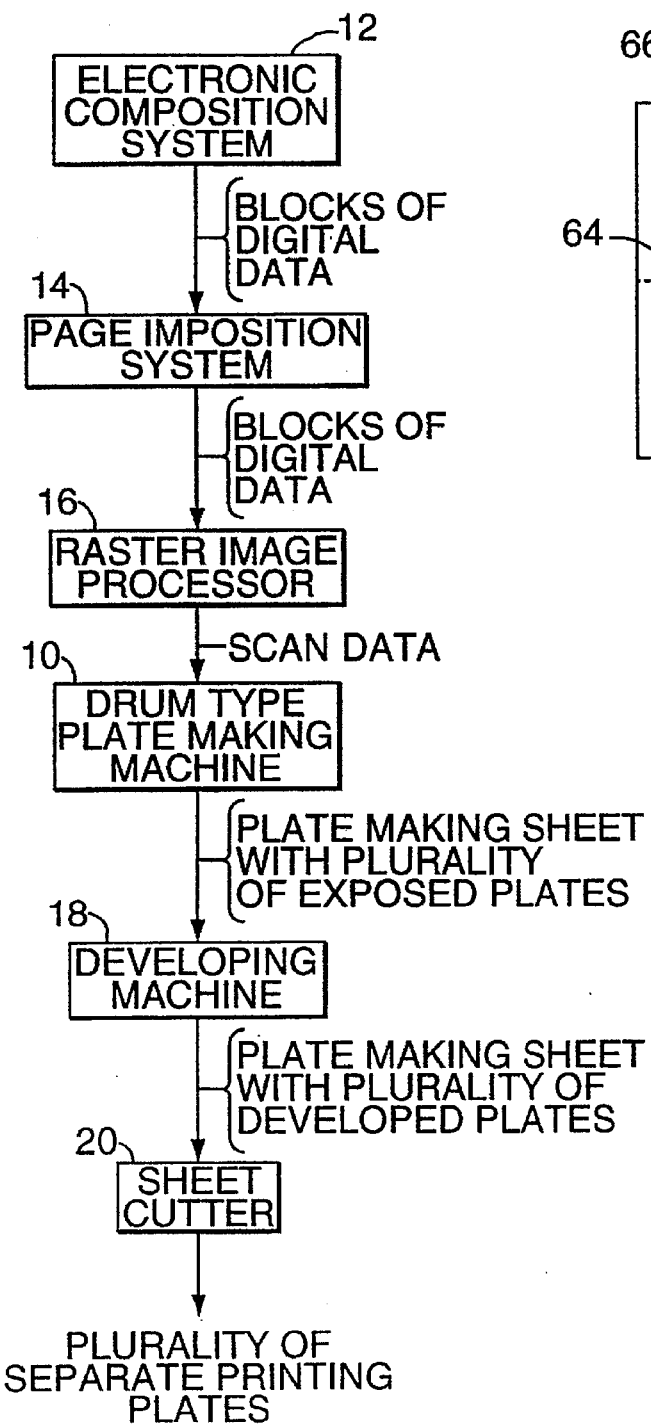

METHOD FOR MAKING A PLURALITY OF PRINTING PLATES

FIELD OF THE INVENTION

This invention relates to a method for making a plurality of printing press printing plates, such as often used for printing newspapers or like publications, where a separate plate is used for printing each page of the publication; and deals more particularly with such a method wherein the printing plates are made in part in an imaging system including a drum type raster scanning plate making machine with the throughput of the method, in terms of number of printing plates capable of being produced during a given time period, being greatly improved in comparison to prior methods using a similar imaging system.

BACKGROUND OF THE INVENTION

In the printing of newspapers and similar publications with modern high speed rotary presses it is well known to have the presses and the printing plates used by them so designed that a separate printing plate is used for the printing of each page, or small group of pages, of the newspaper or other publication. This has the advantage that after printing one edition of the publication, a subsequent slightly different later edition can be printed with the pages that remain the same being printed with the same printing plates as in the previous edition and without removing their plates from the press; and with new plates being made and installed on the press only for the changed pages. When the involved publication is one, such as a newspaper, having relatively large size pages the printing plate used for the printing of each page is usually one used only for the printing of that one page. However, in the case of publications having smaller pages each of the separate printing plates used for the printing of the publication may sometimes be used for the printing of two or more of the pages; and the term "printing plate" as used herein includes both those used for printing single pages as well as those used for printing multiple pages.

It is known to produce printing plates by various photolithographic processes wherein the photosensitive surface of a sheet of plate making material is exposed by an imaging system including a laser or other raster scanning plate making machine controlled by scan data representing the image to be printed by the printing plate to be made from the sheet, the scan data modulating the beam, or other scanned element of the machine, as it is scanned in raster fashion across the photosensitive surface of the sheet of plate making material. It is also known to produce printing plates by using an ink jet as the scanned element with the ink jet, for example, being applied as a masking material over the photosensitive surface of a sheet of plate making material and with the photosensitive surface being exposed in a later step.

Some raster scanning plate making machines are of the "flat-bed" type wherein the plate making material is supported on a flat planar support surface during exposure or other processing by the scanned element. Other such machines are of the "external drum" variety wherein the plate making material is supported on the external surface of a rotating drum during processing. Still another type of such plate making machine is the "internal-drum" variety wherein the plate making material is supported on the internal surface of a non-rotating drum during processing. Because of the drum type machines, especially the internal drum type machines, available at the present time being generally of lower cost and/or better accuracy than flat-bed or other types of available plate making machines, there are many instances in which it would be desirable to use a drum type machine for the production of printing plates.

The handling of plate making sheets in the use of drum type machines is, however, fairly intricate and slow. As each sheet of the material is cycled through the machine a significant portion of the cycle time is devoted to the handling of the sheet, such handling for example including pick-up of the sheet from a supply cassette, transfer of the sheet from the supply cassette to the material support surface of the exposure or other raster processing station, placement of the sheet onto the support surface prior to raster processing, pick-up of the sheet from the support surface after raster processing, transport of the sheet from the supporting surface to a receiving cassette, and placement of the sheet into the receiving cassette or transport of the sheet from the support surface directly to the developing machine or station. Further, drum type machines are usually adapted to receive and hold only one sheet of plate making material at a time on the support surface of the raster processing station, and because of the total time required for the processing of each sheet by the machine the number of printing plates produced during any given period of time has been low, and the production rate of such machines may be insufficient to satisfy the demand for printing plates associated with the printing of newspapers and other similar rapidly reissued publications.

The object of this invention is therefore to provide a method of producing page printing plates using an imaging system with a drum type raster scanning plate making machine whereby the number of printing plates produced by the method during a given time period can be significantly increased in comparison to the number of printing plates produced by previous methods.

Other objects and advantages of the invention will be apparent from the following description and drawings describing and illustrating preferred embodiments of the invention and by the appended claims.

Suitable imaging systems for use with the method of this invention include raster scanning machines which are of the internal drum variety using a scanned laser beam and are shown for example by. U.S. patent application Ser. No. 08/071,567 filed Jun. 1, 1993, Pat. No. 5,484,139, entitled "System for Handling Curved Form Media and Cassette Therefore"; by U.S. patent application Ser. No. 08/117,612, Pat. No. 5,619,246, filed Sep. 7, 1993, entitled "Apparatus and Method for Positioning Photosensitive Media on an Exposure Platen"; and by U.S. patent application Ser. No. 08/148,584, Pat. No. 5,558,320, filed Nov. 8, 1993, entitled "Improved Lifting Shoe for Media Handling and Related Cassette Media Holder", all of which applications are owned by the assignee of the present application.

SUMMARY OF THE INVENTION

The invention resides in a method for producing printing plates through the use of an imaging system including a drum type raster scanning plate making machine whereby for each cycle of a sheet of plate making material through the machine a multiple number of printing plates are made. The invention also more particularly resides in the plate making machine being one using a laser beam as the scanned element in combination with a non-rotating internal drum type surface for supporting the plate making material.

In more detail, the invention resides in a method for making a plurality of printing plates of a given size and shape wherein a plurality of blocks of digital data each including page data representing an image of at least one page to be printed are used to expose or otherwise process a single sheet of plate making material held by the curved support surface of a drum type plate making machine and of such large size and shape that all of the desired plurality of printing plates can be formed therefrom. The blocks of digital data are arranged into scan data for controlling the modulation of, for example, the beam of a laser raster scanning plate making machine or the ink ejection head of an ink jet raster scanning plate making machine such that during the exposure or other raster processing of the surface of the sheet the image represented by the page data of each of the data blocks becomes located on a part of the sheet surface exclusively associated with that image. The sheet of plate making material is then exposed or otherwise processed by the plate making machine under the control of the scan data, and the sheet is afterwards suitably developed to convert the processed surface into a composite printing surface having a plurality of portions each including a page printing surface corresponding to the page image represented by the page data of an associated one of the plurality of blocks of digital data. The developed sheet is then cut to separate it into a plurality of printing plates each having a respective one of the page printing surfaces.

The invention also resides in various ways of providing registration features on the individual printing plates produced by the method for use in locating each printing plate in the printing press with which it is used.

The invention also resides in still further details of the method as defined by the claims.

BRIEF DESCRIPTION OF THE DRAWINGS

FIG. 1 is a flow diagram illustrating one embodiment of the method of the invention.

FIG. 6 is a plan view of another sheet of plate making material which may be used in the method of the invention.

DETAILED DESCRIPTION OF THE PREFERRED EMBODIMENTS

Figure 2:
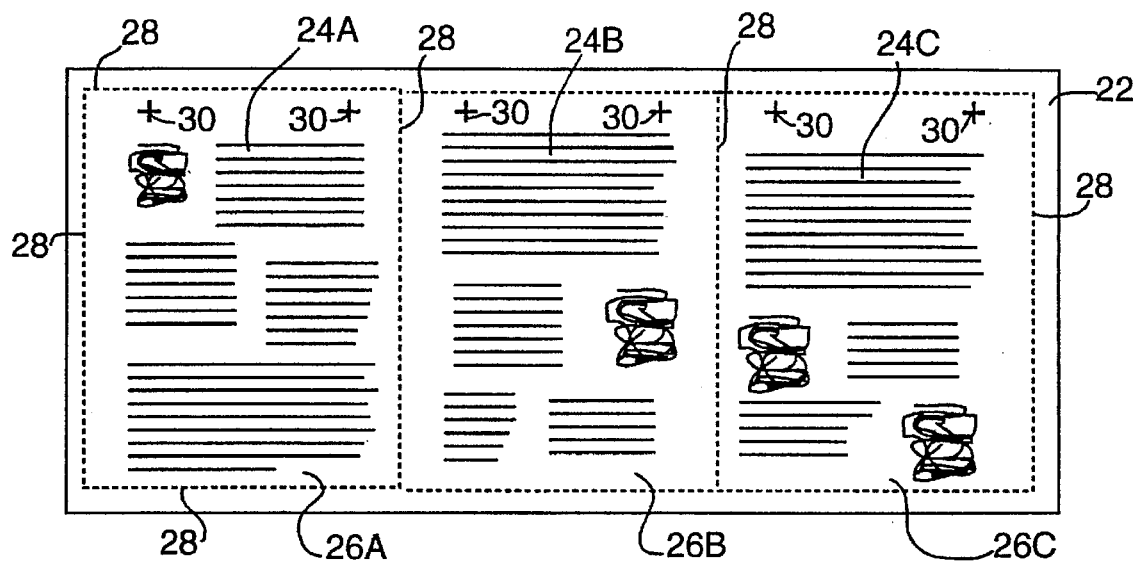
FIG. 2 is a plan view of a sheet of plate making material used in the practice of the method of claim 1 and as seen immediately following the development of its raster processed surface.

Turning to the drawings, FIG. 1 explains the method of the invention by illustrating an exemplary set of components for performing its various steps. The method involves the use of a drum type raster scanning plate making machine, as indicated at 10 in FIG. 1. The machine 10 is one capable of handling relatively large sheets of plate making material from each of which sheets a number of printing plates may be formed. By way of example, the machine may be one handling sheets of plate making material having a size of up to 32 inches by 42 inches with each sheet handled by the machine being used to produce three printing plates each having a nominal size of 13.6 inches by 22.8 inches for use in printing pages of a "tabloid" size newspaper. The machine 10 is preferably one of the non-rotating internal drum type using a laser beam as the scanned element, as shown for example by the three above-mentioned U.S. patent applications, and the invention is hereinafter for convenience described with the machine 10 taken to be of such type, but rotating external drum raster scanning plate making machines may also be used in the practice of the invention, and the machines may also be ones using ink jets or other scanning elements in place of laser beams.

The first general step in the method of the invention is to provide scan data for controlling the modulation of the scanning beam, or other scanned element, of the machine 10 in such a way that during the processing of a single sheet of plate making material by the machine images to be associated with a multiple number of printing plates are transferred onto separate portions of the photosensitive surface of the plate making material used by the machine.

The scan data may be provided in a wide number of ways without departing from the method, and in the illustrated case of FIG. 1 is taken to originate from an electronic composition system 12 working in cooperation with a page imposition system 14 and a raster image processor 16. The electronic composition system 12 may be of any well known type wherein for example, portions of the graphic material making up a page are supplied by various different types of inputs providing digitized text and digitized art work, the portions of the graphic material are laid out or assembled with one another to make up a page using an interactive visual display terminal, and the data representing each laid out page is output from the system as part of a block of digital data. That is, each block of data output by the electronic composition system includes page data representing the image of at least one page to be printed.

The blocks of digital data output by the electronic composition system are supplied to the page imposition system 14, and are later read out of that system for use by the raster image processor 16.

Each block of digital data supplied by the electronic composition system 12 to the page imposition system 14 includes the page data to be used for the making of one printing plate. The raster image processor 16 produces sequences of scan data with each sequence being the data used to control the modulation of the exposure beam of the machine 10 during the exposure of a single sheet of plate making material. Therefore, in its operation, the raster image processor 16 in producing each sequence of scan data extracts from the page imposition system 14 the plurality of blocks of digital data associated with the plurality of printing plates to be exposed on the plate making material and then arranges the page data of those blocks into a sequence with the arrangement of the data in the sequence being such that under the control of the scan data of the sequence the machine 10 exposes the images represented by the page data of the involved data blocks onto separate parts of the photosensitive processable surface of the plate making material.

Once the sequence of scan data is available for use in exposing a sheet of plate making material the scanning machine 10 is operated under the control of that sequence of scan data to expose the photosensitive surface of a single sheet of plate making material. This step of exposing or processing the sheet of plate making material of course is only a part of one operating cycle of the machine 10 with such operating cycle also including various ancillary steps in the handling of the plate making sheet —that is the steps involved in moving the sheet from a supply station to the exposure station and from the exposure station to a delivery station.

After the exposure of a sheet of plate making material by the machine 10 the exposed sheet of plate making material is transferred, in a light tight container where necessary, depending on the emulsion used, to a developing machine 18 which develops the exposed photosensitive surface of the sheet to convert that surface into a composite printing surface which, as a result of the manner of exposure, has a plurality of portions each including a page printing surface corresponding to a respective one of the page images represented by the plurality of blocks of digital data used in forming the associated sequence of scan data. The developed sheet of plate making material produced by the developing machine 18 is then cut by a suitable sheet cutter 20 to separate the sheet into individual printing plates each having a printing surface bearing a respective one of the page images represented by the page data used in making up the sequence of scan data. It is significant that the sheet is cut into individual printing plates after the developing process, since the plates will be much less susceptible to scratching, particularly since most plates are heated to toughen the emulsion as part of the developing process. Should a light sensitive emulsion be used, carrying out the cutting operation after development also eliminates the need to maintain the sheet in a light tight enclosure during the cutting operation.

Figure 3:
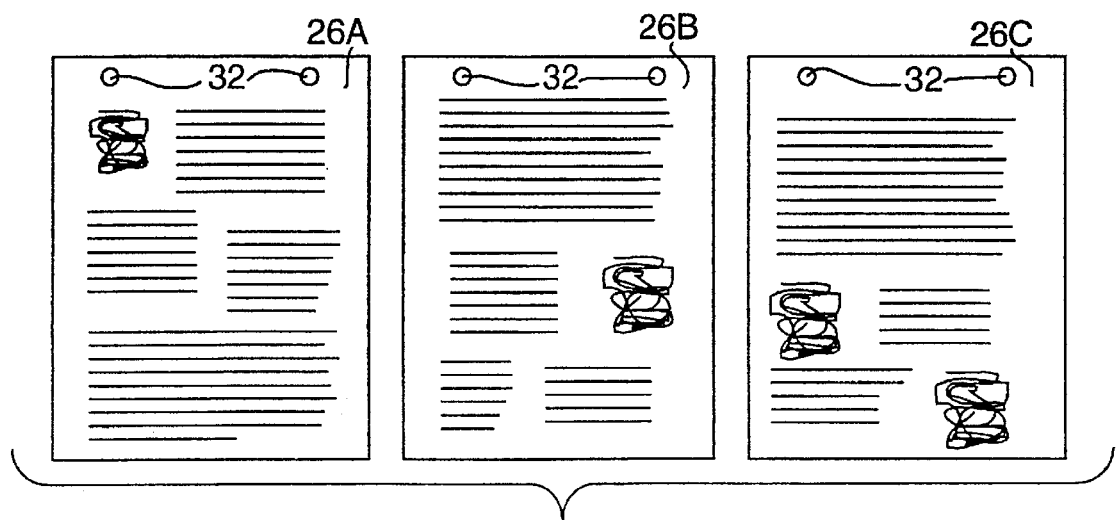
FIG. 3 is a plan view showing the sheet of plate making material of FIG. 2 following the step of cutting it into individual printing plates and removing waste material.

FIG. 1, as described above, illustrates the basic steps of the inventive method. In addition to these steps, the method may also include steps providing for the making of cut out registration features in each of the printing plates produced from a sheet of plate making material for use in registering each plate during its installation onto the rotary printing drum of a printing press. FIGS. 2 and 3 illustrate one way in which such cut out registration features may be provided. In this procedure visible registration marks are included on the developed surface of each printing plate. For example, in FIG. 2 a developed printing plate is indicated at 22 with its developed photosensitive surface facing the viewer. The page images of three separate printing plates are indicated at 24A, 24B and 24C and the boundaries of the three individual printing plates 26A, 26B and 26C are shown by the broken lines 28. In addition to the page image each of these printing plates also includes visible registration marks 30 shown as crosses in FIG. 2. The registration marks 30 are then visually detected and used to determine the location of the registration cut outs to be made in each of the printing plates, and the cut outs are then made at these defined locations. In FIG. 3 the individual printing plates cut from the sheet 22 of FIG. 2 are again shown at 26A, 26B and 26C and the registration cut outs formed therein are shown to be, for each printing plate, two registration holes 32,32 cut into each sheet. Another alternative is to use punched holes, slots, or other cut out references produced on the sheet stock before loading in the scanning machine, or at least before the sheet is cut into individual printing plates. These cut out references may then be used to hold the sheet in position during the cutting operation.

Of course, the placement and shape of the registration cut outs made in each printing plate may vary widely depending on the registration system used by the rotary press roll onto which the plates are to be installed. The visual marks 30 produced on the developed sheet 22 can result from data describing such marks being included in the scan data used for the exposure of the plate making sheet, and in turn, the data for such marks can be introduced by the electronic composition system 12 at the time of producing each block of digital data. Also, the cutting of the registration holes 32 or other registration features into the individual printing plates can take place either before or after the cutting of the developed sheet 22 along the lines 28 to separate the printing plates from one another.

Figure 4:
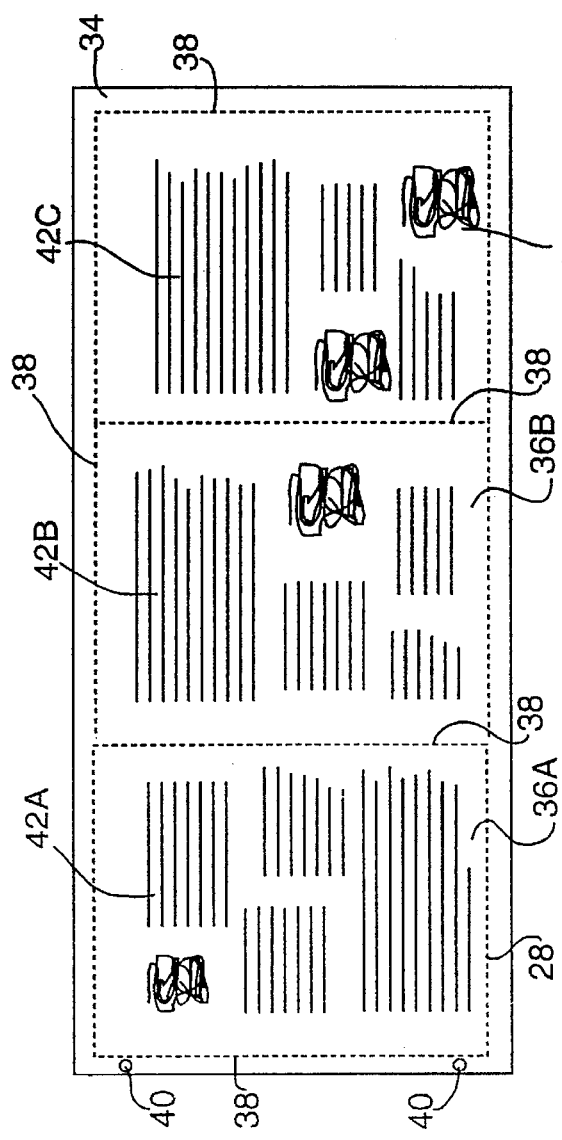
FIG. 4 is a plan view of a sheet of plate making material as seen immediately following the developing step of a method comprising another embodiment of the invention.

FIG. 4 illustrates another way for dealing with the provision of registration cut outs in the printing plates produced from each sheet of plate making material. In this figure a developed sheet of plate making material is indicated at 34. Three printing plates to be cut from the sheet are indicated at 36A, 36B and 36C and their boundaries are indicated by the broken lines 38. In this case the sheet 34 has a number of registration cut outs, such as the illustrated two holes 40 which are preformed in the sheet prior to its being used by the plate making machine 10. The two holes 40,40 are then used to accurately locate the sheet 34 on the support surface of the exposure station of the machine 10 so that the page images 42A, 42B and 42C exposed on the sheet 34 are accurately located relative to the registration holes 40. Then, after the development of the sheet 34 the registration holes 40 can be used to accurately locate the sheet 34 to cut registration features into each of the printing plates 36A, 36B and 36C, such as the registration holes 32 of FIG. 3; and the registration holes 40 can also be used to accurately locate the sheet 34 during its cutting along the lines 38 to separate the three printing plates from one another.

Another alternative regarding the provision of registration features is to use punched holes, slots or other cut out shapes produced in the sheets of plate making material prior to their loading onto the support surface of the exposure station with such cut outs including both ones, such as the holes 40 of FIG. 4, for registering the sheets on the supporting surface of the exposure station or in a cutting machine, and other ones, such as the holes 32 of FIG. 3 for registering the printing plates in a printing press.

Figure 5:
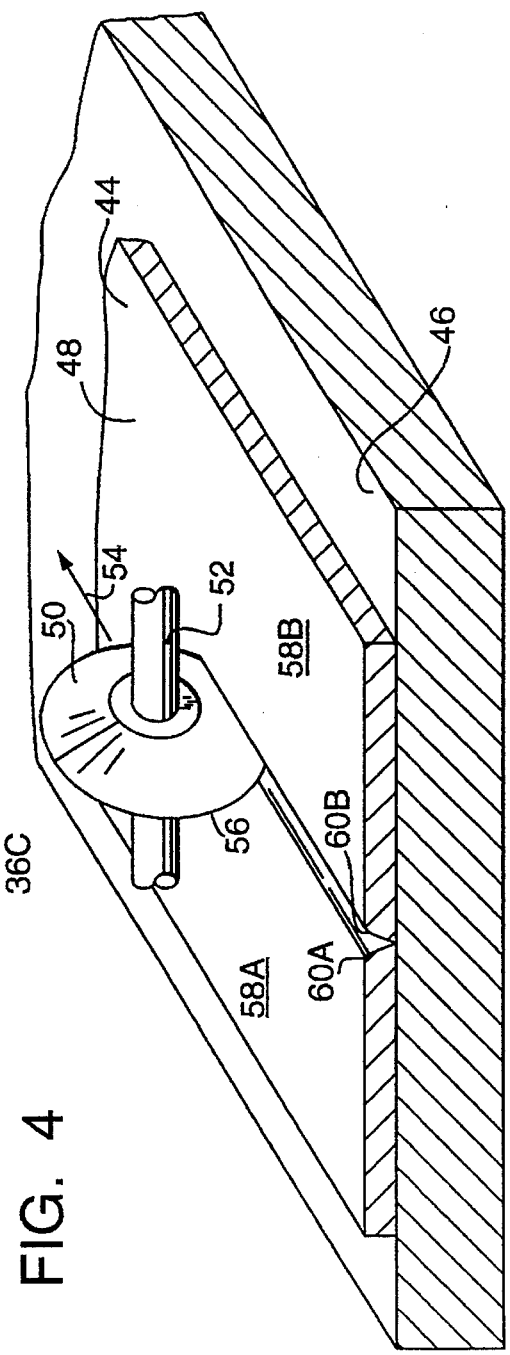
FIG. 5 is a fragmentary perspective view showing the cutting of the sheet of plate making material.

In the cutting of a sheet of plate making material to separate the printing plates from one another it is essential that the cutting be done in such a way that no burrs are produced which might extend upwardly from the printing surfaces of the plates and interfere with the printing process. Various ways of cutting the material to avoid such burrs may be employed, and one is shown by way of example in FIG. 5. Referring to this figure, in the cutting step illustrated there the sheet 44 of plate making material is cut by supporting it onto a rigid support surface 46 with its developed printing surface 48 facing upwardly. It is then cut along the desired printing plate boundary lines by a rotary cutting knife 50 rotatably supported on an axle 52 and moved in the direction of the arrow 54 along the lines of cut with the cutting edge 56 of the knife kept very close to or in engagement with the support surface 46. Therefore, in the cutting process the printing surface of each printing plate 58A and 58B is deformed downwardly, as indicated at 60A and 60B adjacent its cut boundary edge to avoid the creation of any upstanding burrs.

It will also, of course, be understood that the arrangement of the printing plates on a sheet of sheet making material, and the number of printing plates to be made from each sheet of plate making material, may vary within the constraints imposed by the maximum size sheet capable of being handled by the plate making machine at hand and the desired size of the plates to be cut from such sheet. Also, in many cases it may be desirable that the sheet of plate making material be sized so that the sheet need not be cut along edges other than those between neighboring printing plates. As an example of this, FIG. 6 illustrates a rectangular sheet 62 of plate making material which in the practice of this invention is eventually cut along only two lines 64 to produce four separate printing plates 66 from the sheet.

I claim:

1. A method for making a plurality of page printing plates of given size and shape from a plurality of blocks of digital data each of which blocks of digital data includes page data representing an image of at least one page to be printed, said method comprising:

providing a sheet of plate making material having a processable surface of such size and shape that all of said plurality of printing plates can be formed therefrom, arranging said page data of said plurality of data blocks into scan data for use by a raster scanning plate making machine having a drum shaped support surface for holding a sheet of plate making material, with the arrangement being such that during the processing of said processable surface by said machine the page image represented by the page data of each of said data blocks is transferred onto a part of said processable surface exclusively associated with said image, processing said processable surface of said sheet of plate making material by means of a raster scanning plate making machine using said scan data and having a drum shaped support surface holding said sheet during said processing, developing said sheet of plate making material to convert said processable surface into a composite printing surface having a plurality of portions each including a page printing surface corresponding to a respective one of the page images represented by said plurality of blocks of digital data, and then cutting said developed sheet of plate making material to separate said sheet into a plurality of separate page printing plates each having a respective one of said page printing surfaces.

2. The method for making a plurality of page printing plates as defined in claim 1, further characterized by:

said sheet of plate making material being one wherein said processable surface is a photosensitive surface, said support surface being an internal drum shaped surface, and said raster scanning plate making machine being one using a raster scanned laser beam for said processing of said processable surface.

3. The method for making a plurality of page printing plates as defined in claim 1, further characterized by:

said raster scanning plate making machine being one using a raster scanned ink jet for said processing of said processable surface.

4. The method for making a plurality of page printing plates as defined in claim 1, further characterized by:

combining with the page data of each of said data blocks other data representing registration marks at precisely defined locations relative to the associated page image, and including said registration mark data in said scan data so that when said sheet is developed during said developing step said registration marks are produced along with said page images and become converted into visible registration marks.

5. The method for making a plurality of page printing plates as defined in claim 4, further characterized by:

following said step of developing said sheet of plate making material using said visible registration marks to define the locations of registration features to be cut into each of said plurality of separate page printing plates, and thereafter cutting registration features in each of said plurality of page printing plates at said defined locations.

6. The method for making a plurality of page printing plates as defined in claim 5, further characterized by:

said step of defining the locations of registration features to be cut into said page printing plates and said step of cutting said registration features in each of said page printing plates being carried out prior to said step of cutting said sheet into separate page printing plates.

7. The method for making a plurality of page printing plates as defined in claim 5, further characterized by:

said step of defining the locations of registration features to be cut into said page printing plates and said step of cutting said registration features in each of said page printing plates being carried out during said step of cutting said sheet of plate making material into separate page printing plates.

8. The method for making a plurality of page printing plates as defined in claim 5, further characterized by:

said step of defining the locations of registration features to be cut into said page printing plates and said step of cutting said registration features in each of said page printing plates being carried out after said step of cutting said sheet of plate making material into separate page printing plates.

9. The method for making a plurality of page printing plates as defined in claim 1, further characterized by:

said step of providing a sheet of plate making material being one wherein said sheet has in it at least two registration cut outs, using said registration cut outs to accurately position said sheet in said plate making machine during said step of exposing said photosensitive surface, after said step of developing said photosensitive surface of said sheet using said registration cut outs to accurately locate said sheet in a cutting device, and then operating said cutting device to cut registration features into each of said parts of said sheet.

10. The method for making a plurality of page printing plates as defined in claim 1, further characterized by:

said step of providing a sheet of plate making material being one wherein said sheet has in it at least two registration cut outs, using said registration cut outs to accurately position said sheet in said plate making machine during said step of exposing said photosensitive surface, after said step of developing said photosensitive surface of said sheet using said registration cut outs to accurately locate said sheet in a cutting device, and then operating said cutting device to cut said sheet into said plurality of separate page printing plates.

11. The method for making a plurality of page printing plates as defined in claim 1, further characterized by:

said step of providing a sheet of plate making material being one wherein said sheet has in it at least two registration cut outs, using said registration cut outs to accurately position said sheet in said plate making machine during said step of exposing said photosensitive surface, after said step of developing said photosensitive surface of said sheet using said registration cut outs to accurately locate said sheet in a cutting device, and then operating said cutting device to cut registration features into each of said parts of said sheet and to cut said sheet into said plurality of separate page printing plates.

12. The method for making a plurality of page printing plates as defined in claim 1, further characterized by:

taking said composite printing surface of said developed sheet of plate making material to be facing upwardly, performing said step of cutting said developed sheet of plate making material in such way that along each edge of each of said separate printing plates cut during said cutting step the material of said plate adjacent its printing surface is deformed downwardly to avoid the production of burrs extending upwardly beyond said printing surface.

13. A method for making a plurality of page printing plates of given size and shape from a plurality of blocks of digital data each of which blocks of digital data includes page data representing an image of at least one page to be printed, said method comprising:

providing a sheet of plate making material having a photosensitive surface of such size and shape that all of said plurality of printing plates can be formed therefrom, providing a laser raster scanning plate making machine having a non-rotatable internal drum support surface for supporting a sheet of plate making material, arranging said page data of said plurality of data blocks into scan data for use by said plate making machine with the arrangement being such that during the exposure of said photosensitive surface by said machine the page image represented by the page data of each of said data blocks is exposed onto a part of said photosensitive surface exclusively associated with said image, placing said sheet of plate making material onto said support surface of said plate making machine, processing said photosensitive surface of said sheet of plate making material by operating said plate making machine using said scan data, developing said sheet of plate making material to convert said photosensitive surface into a composite printing surface having a plurality of portions each including a page printing surface corresponding to a respective one of the page images represented by said plurality of blocks of digital data, and then cutting said developed sheet of plate making material to separate said sheet into a plurality of separate page printing plates each having a respective one of said page printing surfaces.

* * * * *